March 22, 1927.
G. W. HAYDEN
1,621,722
ELECTROSTATIC CONDENSER
Filed July 6, 1926   2 Sheets-Sheet 1
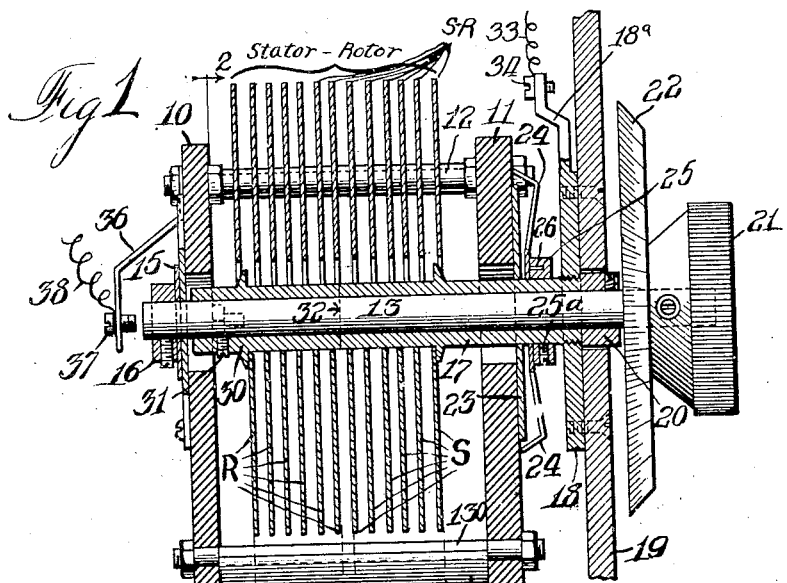
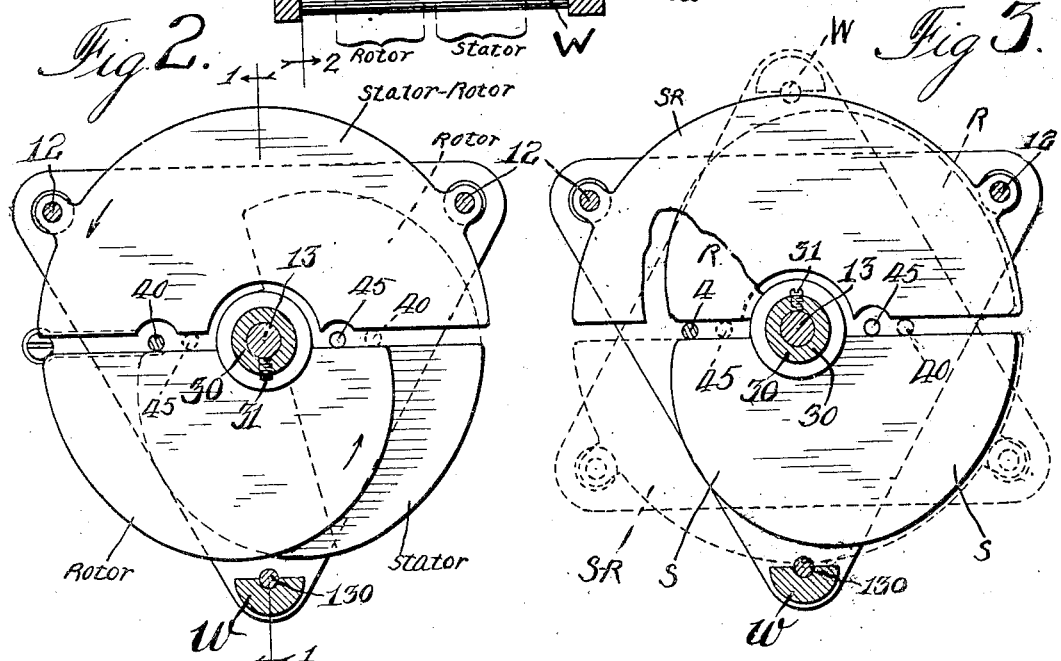
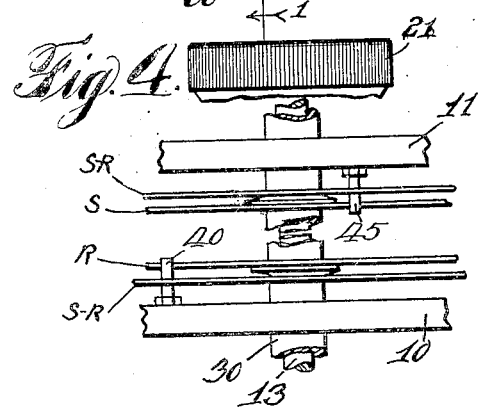
Inventor:
George W. Hayden
By Luther Johns, Atty.

March 22, 1927.  1,621,722
G. W. HAYDEN
ELECTROSTATIC CONDENSER
Filed July 6, 1926   2 Sheets-Sheet 2
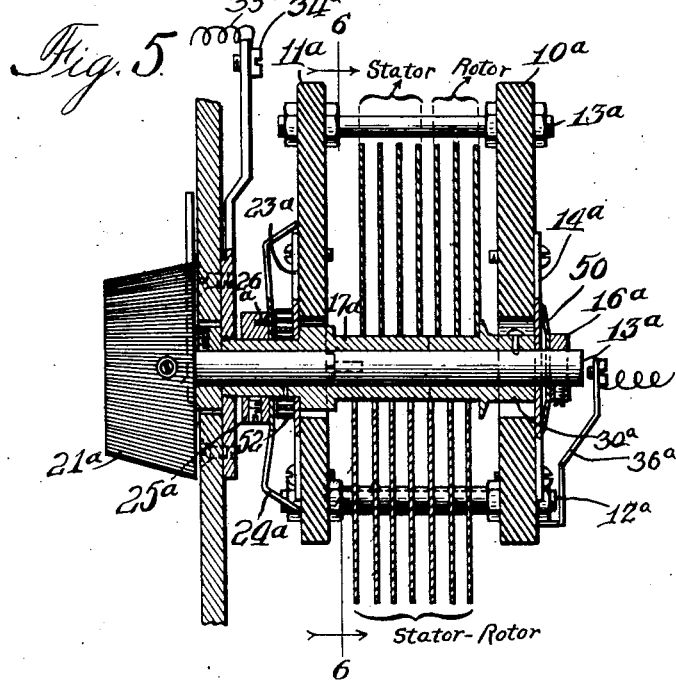
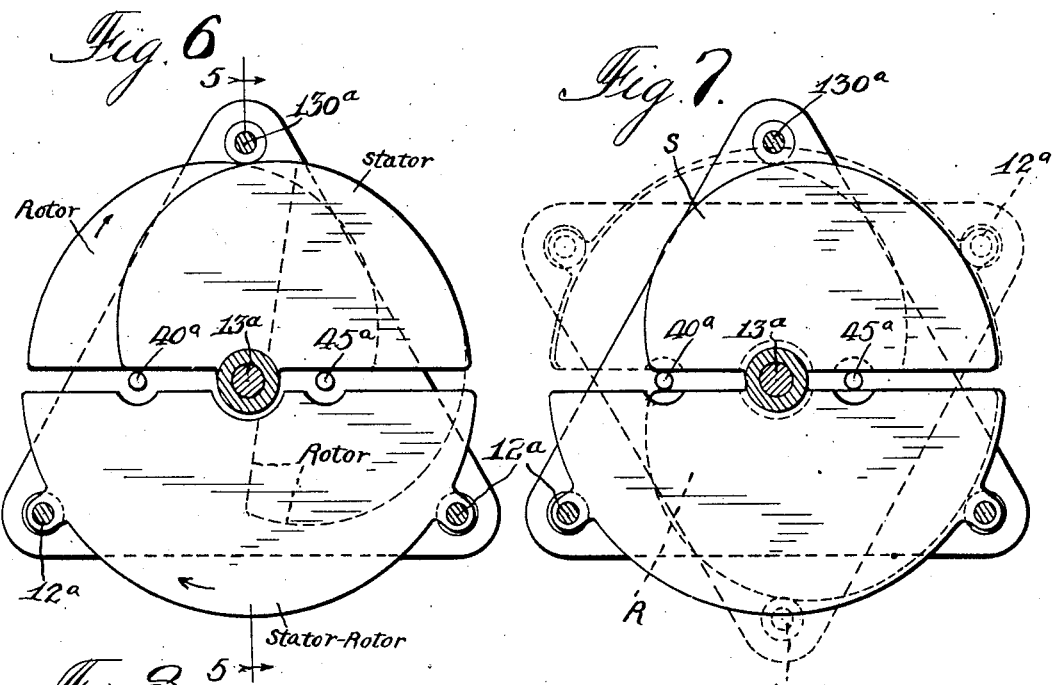
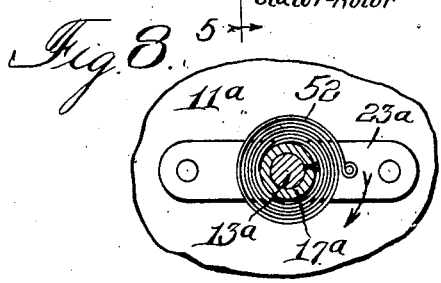
Inventor
George W. Hayden
By Luther Johns
Atty.

Patented Mar. 22, 1927.

1,621,722

UNITED STATES PATENT OFFICE.

GEORGE W. HAYDEN, OF OAK PARK, ILLINOIS.

ELECTROSTATIC CONDENSER.

Application filed July 6, 1926. Serial No. 120,555.

The present improvements relate more particularly to electrostatic condensers of the movable-plate type according to which the capacitance, capacity, or condenser effect is increased or decreased according to the amount or extent of overlap between plate elements of one series and opposed plate elements of another series.

These improvements have a valuable application in connection with radio broadcasting and receiving instruments of various kinds. Each radio receiving set is usually equipped with several electrostatic condensers of the variable type and which are manipulated to tune the several circuits. In view of the great number of transmitting stations which have come upon the air, and which are daily being added, the difficulty of tuning the receiving set to a given signal has become very pronounced and is constantly becoming more so, since most of the transmitting stations respectively are on wave lengths or frequencies very close to one or several others.

The prime object of the present invention is to provide an electrostatic condenser of unusual efficiency both with respect to its delicacy or critical refinement of operation in adding or subtracting capacity and with respect to the scope or range of frequencies (low to high) in connection with which it may be used. It is an object to provide a variable condenser according to which the increment of condenser effect may at all stages be notably small with a given amount of rotor movement, and which, nevertheless, will provide a total capacity, capacitance or condenser effect as large as may be desired.

It is an object to provide a condenser of the plate type having stator and rotor elements according to which the rotor elements are moved through substantially three hundred and sixty degrees to develop the full condenser effects, as distinguished from the well-known plate condensers which provide their full condenser effects respectively through a rotor movement of substantially one hundred and eighty degrees, and to provide a device having so large an amount of rotor movement without sacrificing condenser-plate surface.

It is an important object to provide results such as the foregoing in a device which is of simple construction, which is strong and durable, not likely to get out of order, and which for any given total capacity desired may be relatively small and compact; and also to provide a construction which may be formed cheaply and expeditiously and assembled according to simple and well- and also to provide a construction which may easily be taken apart as occasion may suggest, and which has appropriate features of adjustment for the suitable spacing of the rotor and stator elements.

Still other objects and advantages will appear hereinafter.

In my co-pending application Serial No. 102,381, filed April 16, 1926, on variable condensers, I have shown a device according to which there are two rotors instead of the one usually found in electrostatic condensers of this general type. According to that device the condenser effects are developed through a movement of first one and then the other of the rotors into the stator, and on the reverse movement first one and then the other rotor is withdrawn from overlapping relation with plates of the stator, the rotors being so associated operatively with each other that a finger-piece connected directly with the operating shaft moves continuously in one direction through substantially three hundred sixty degrees, whether that direction be for intermeshing the plates or for separating them. The construction of that device is further such that the second series of rotor plates to overlap stator plates is the first to emerge from the stator plates, whereby the first rotor to enter the stator may have a smaller number of plates than those of the other rotor, or such first-entering stator plates may be reduced in area, either as a whole or successively, to the effect that a notably small amount of condenser effect may be developed in the initial increment movements, with the further advantage that these initial movements may be carried through substantially one hundred and eighty degrees, thus providing for exceedingly fine variations of capacitance throughout the shorter wave lengths in radio practice, while an unusually large amount of capacity effect as a whole may be developed through very small and gradual increments in a substantially small and compact device.

In the present improvements numerous characteristics of the device of my said copending application are present; for instance, the rotation of a direct-connected finger-piece through substantially three hundred and sixty degrees to develop the full condenser effects, and in the provision of three series of condenser plates. There are also present here similar tensioning means for providing that one series of plates shall move at a given time while another series is restrained from movement.

It will assist the understanding of the following detailed description to mention at this place some of the peculiar characteristics of the present device. For instance, the series which I will call the rotor is first turned through substantially one hundred and eighty degrees into overlapping relation with the series which I shall describe as the stator-rotor, leaving some of the stator-rotor plates unoccupied by rotor plates; the stator-rotor then being turned through substantially one hundred and eighty degrees whereby such unoccupied stator-rotor plates intermesh with stator plates, the rotor plates continuing to remain in intermeshing relation with stator-rotor plates. On the reverse movement of the shaft one series of the intermeshing plates comes out of such relation, followed by the other. In one of the forms here shown the last series to enter is the last to emerge, while in the other and preferred form the last series to enter is the first to emerge.

According to the structures illustrated herein the stator-rotor plates are carried by a frame revoluble on the common axis. The rotor plates are first turned into mesh with some stator-rotor plates, and a continued movement of the shaft then carries the entire frame around to bring other stator-rotor plates into mesh or overlap with the relatively fixed or stator plates.

Turning to the drawings, Figure 1 is a vertical section through one form of the device as on the line 1—1 of Fig. 2 viewed in the direction of the arrows; Fig. 2 is a sectional view as on the line 2—2 of Fig. 1; Fig. 3 is a view similar to that of Fig. 2 but showing changed positions of parts; Fig. 4 is a fragmentary top view designed to show the coaction of certain stop members carried by the frame; Fig. 5 is a medial vertical section of a modified form of structure as on the line 5—5 of Fig. 2; Fig. 6 is a section on the line 6—6 of Fig. 5 in the direction of the arrows; Fig. 7 is a view similar to Fig. 6 showing changed positions of parts; and Fig. 8 is a detail showing the motive power spring and its connections.

Turning to Figs. 1 to 4 inclusive, the device illustrated is shown as comprising a frame having two triangular end pieces of insulating material 10 and 11, for instance hard rubber, connected by two upper metallic posts 12 and a lower metallic post 130, these posts having nuts thereon holding the parts rigidly together. The shaft 13 extends through a substantially large opening in each of the frame walls 10 and 11 and is mounted at its outer end in a bearing plate 14 secured as by screws to the insulating wall 10, there being a washer 15 and an adjustable collar 16 limiting the movement of the shaft in one longitudinal direction.

The shaft 13 is held in its normal position by a bearing in the form of a sleeve 17 encompassing the shaft with a nice fit and held in a relatively fixed position by a plate 18 into which the sleeve 17 is tightly threaded, the plate 18 being held as by screws upon the panel-board 19. An adjustable collar 20 bearing against the supporting plate 18 limits the longitudinal movement of the shaft 13 in the direction opposite to that limited by the collar 16. A finger-piece 21 and dial 22 secured directly upon the shaft 15 provide means for rotating the shaft, with the sleeve 17 acting as the main support and bearing therefor.

The frame of the device is carried at its inner end by a bearing member 23 held as by screws upon the frame wall 11, the bearing sleeve 17 passing through this plate 23. Since the frame is carried at one end by the bearing plate 15 directly upon the shaft 13, and at its other end by the bearing plate 23 turning upon a fixed sleeve 17, it is clear that the frame may rotate on the axis of the shaft.

The tensioning spring 24 has its free ends bearing upon the smooth surface of the insulating frame wall 11. It is held in a given position of spring adjustment by the collar 25 held by a set screw 25$^a$, there being a pin 26 holding the spring 24 fixed with respect to the collar 25. The set screw in the collar 25 holds this collar upon the supporting sleeve 17 and since this sleeve is relatively fixed and nonrotatable it is evident that the spring 24 is also a relatively fixed member. The frame part 11, however, is rotatable, as stated, and when this frame part 11 turns on its axis it moves frictionally upon the tensioning spring 24.

A sleeve 30 similar to the sleeve 17 is mounted on the shaft 13, the set screw 31 holding it firmly upon the shaft. The sleeve 30 abuts the sleeve 17 at the dotted line 32.

A plurality of stator plates S are affixed to the supporting sleeve 17 in any approved way, as by soldering. Rotor plates R are secured, as by soldering, to the sleeve 13. These stator and rotor plates are obviously in electrical communication with each other, being mounted on the same shaft. If an electrical connector as 33 be secured as by the screw 34 to the extension 18$^a$ of the supporting plate 18 the stator and the rotor plates will all simultaneously be placed in communication with the side of the circuit indicated by the conductor 33.

The stator-rotor plates S—R are carried by the frame on the bolts 12 and are sufficient in number and so spaced apart as to accommodate in the usual intermeshing relation a series of rotor plates and stator plates, the intermeshing plates being spaced apart to provide an air-dielectric between opposed surfaces. Figs. 2 and 3 show that these plates S—R are severally provided with ears through which the bolts 12 extend. In Fig. 1 spacing collars are shown between these plates, and it is to be understood that the plates are soldered to their supporting means so as to place them all in good electrical communication with at least one of the rods 12. One of these rods 12 carries a conductor 36 so directed that the screw 37 therein may be substantially on the axis of the shaft whereby a "pig-tail" 38 leading current to the stator-rotor may receive substantially only torsional movement through the turning of the frame.

It is thus clear that the stator-rotor is in one side of the circuit while the rotor and the stator are in the opposite side thereof, and that the condenser effects are had through the intermeshing of rotor and stator plates with the plates of the stator-rotor.

As the device is illustrated in Fig. 1, the plates are entirely out of mesh. Assuming that the finger-wheel 21 is turned in the clockwise direction in Fig. 1, the movements of the rotor as viewed in Fig. 2 will be anti-clockwise, since in that figure we are viewing the device from the rear, that is, toward the finger-wheel. Turning to Fig. 2, then, this anti-clockwise movement of the rotor first carries it into its dotted-line position shown in Fig. 2, which kind of movement continues through substantially one hundred and eighty degrees and until the rotor strikes the stop 40. This one-hundred-and-eighty-degree position of the rotor is shown by dotted lines in Fig. 3. At such time the rotor is entirely in mesh with the stator-rotor, and since the rotor and the stator-rotor are in opposite sides of the circuit, condenser effects have been developed through all stages of the movement.

Now, with the rotor contacting stop 40 carried by the frame, if the shaft 13 be turned further in the same advancing direction, the frame will be pushed around on its axis against the tension of the spring 24, and this movement may be continued substantially one hundred and eighty degrees, and to such effect that plates of the stator-rotor not occupied by plates of the rotor will be carried into overlapping relation with the stator plates.

Fig. 3 shows by dotted lines how the frame has been turned upside down by such one-hundred-and-eighty-degree movement, and with the frame in its dotted line position in Fig. 3 the rotor and stator-rotor have moved into a position corresponding to that of the fixed stator. In other words, all of the plates are below the axis in the dotted line position of Fig. 3. At the beginning the stator was above the axis and the other two series were below. Then the rotor was moved above the axis, and then the stator and the rotor were simultaneously moved below. In that position the rotor has traveled through substantially three hundred and sixty degrees and the stator-rotor has traveled one hundred and eighty degrees.

A counter-weight W carried by the frame is located opposite the stator-rotor plates.

On the reverse movement of the dial (being in the anti-clockwise direction in Fig. 1 and in the clockwise direction in Figs. 2 and 3) since the frame is frictionally held by the tension spring 24, the first reverse movements will carry the rotor plate out of mesh with stator-rotor plates, and this movement will continue through substantially one hundred and eighty degrees and until the rotor contacts stop 45 carried by the frame, whereupon a continued reverse movement of the finger-piece carries the frame around also until it has traveled through one hundred and eighty degrees, leaving the parts in their relative positions shown by full lines in Fig. 2.

It is to be observed that according to this construction the plates last to become intermeshed are the ones last to come out of such intermeshing relation. Where the stator plates and the rotor plates are equal in number and are of substantially the same shape and size and the stator-rotor is also formed so that the condenser effects are substantially the same with respect to the intermeshing of either the rotor or the stator plates therewith, this construction just described will be satisfactory. Under such conditions, however, as where it is desired to have a more gradual relative increment of capacity effects in the earlier stages the present construction would result in such gradual increment but without the corrollary requirement of a correspondingly gradual decrement over the range of the lower wave lengths on the reverse movement. In order to provide for the last mentioned results I have shown a device in Figs. 5 to 8 inclusive which, as to the main structural parts, is in all substantial respects like the device of Fig. 1.

Turning to Figs. 5 to 8 inclusive, certain details of construction are numbered in correspondence with the similar parts of Figs. 1 to 4 inclusive, but to distinguish these parts the reference characters have a small *a* added thereto, and the main construction will not be again specifically described. It will be noted that as the device of Fig. 5 is illustrated the frame is turned around, whereby the stator-rotor plates are at the bottom instead of at the top as in Fig. 1. Since the stator, the rotor, and the stator-rotor elements are so marked in the drawings, it will be unnecessary further to identify them in the following description.

In Fig. 5 it will be noted that there is a spring washer 50 held in any preferred degree of tension by the collar 16ª. This provides that the rotor carried by the shaft has a small amount of frictional resistance. After the rotor has been turned one hundred and eighty degrees into the stator-rotor and the movement is continued the stator-rotor is carried around against spring tension provided by the spring 24ª, as in the device of Fig. 1. The coil spring 52 (Fig. 8) has its outer end secured to the bearing member 23ª while its inner end is secured to the supporting sleeve 17ª. As the frame moves around in the clockwise direction the motive power spring 52 is put under tension. This tension is not sufficient, however, to move the frame in the reverse direction when held by the combined tension of the spring washer 50 and the tension spring 24ª but is sufficient to move it in the reverse direction under the tension of the spring 24ª alone. When the rotor is turned back by hand, thus relieving some of the tension holding the frame, the motive power spring 52 causes the frame to move back, so that as fast as the rotor is turned back the frame holding the stator-rotor plates follows along, all to the result that on the reverse movement of the shaft the rotor and the stator-rotor simultaneously move through one hundred and eighty degrees, and to such effect also that the last series of plates to become intermeshed is the first series to be brought out of intermeshing relation.

Distinguishing between the operative steps of the device of Fig. 1 and that of Fig. 5 it is pointed out that in the device of Fig. 1 the rotor turns into the stator-rotor and then the stator-rotor and the rotor as a combined unit are moved another one hundred and eighty degrees to bring plates of one of these combined units or members into intermeshing relation with stator plates, the latter one-hundred-and-eighty-degree movement being against the yielding resistance of the tensioning spring 24, and that on the reverse movement, since the frame is so tensioned and held, the rotor first comes out of intermesh with the stator-rotor and then the stator-rotor is moved in the reverse direction. In the device of Fig. 5 the rotor similarly turns into the stator-rotor through a movement of one hundred and eighty degrees and then the stator-rotor is moved, but during this latter movement the coiled spring 52 is put under tension, the combined holding resistance of the spring washer 50 and the tension spring 24ª being sufficient to hold the parts in any given position of adjustment, while on the reverse movement (the operator relieving the tension produced by the spring washer 50) the frame carrying the stator-rotor moves back in response to the spring 52 as rapidly or as slowly as the operator turns the finger-piece in the reverse direction and until the reverse movement has gone through substantially one hundred and eighty degrees. Thereupon the movement of the stator-rotor is stopped, and the continued reverse movement carries the rotor out of intermesh with the stator-rotor. In this instance, then, the condenser effects are subtracted in the same steps by which they were added.

In this connection it should be pointed out that it is not necessary to have two yielding resistances such as are provided by both the spring washer 50 and the spring 24ª, and that in Fig. 5 it may be considered that the tensional yielding resistance of the spring washer 50 is so materially great as to hold the rotor and the stator-rotor members against reverse movement tending to be induced by the coil spring 50, in which conception of the tension of the spring washer 50 the tension of the spring 24ª may be considered nil. The construction shown in Fig. 5 illustrates how through the addition of a rotative motive-power spring, such as 52 for instance, the general construction of Fig. 1 may be modified to bring about a change in the order of plate movements when the direction of hand operation is reversed. The spring washer 50 was added in the device of Fig. 5 largely as a matter of convenience in making ready adjustments, and to insure sufficient resistance to the rotor movements to render the adjustment of the spring 24ª less critical. Since then, the construction shown in Fig. 5 thus illustrates how one yielding resistance may be sufficient, the appended claims, where such feature is referred to, should not be limited to two yielding resistances unless specifically so indicated in a particular claim or claims.

I am aware of various changes, departures and modifications which may be made in the construction and arrangement of parts within the spirit of the improvements thus set forth, and I contemplate as being included herein all such changes, modifications, departures and variations from what is specifically herein illustrated and described as fall within the scope of the appended claims.

I claim:

1. In an electrostatic condenser of the character described, the combination of a stator, a rotor member, and a stator-rotor member, each of said members and said stator comprising a plurality of plates side by side and spaced apart, the rotor member and the stator-rotor member being mounted on a common axis for rotative movement and for intermeshing relation with each other, the stator being mounted to have intermeshing relation with one of said members, and means for rotatably moving first one of said members to bring plates thereof into overlapped and spaced relation with plates of the other thereof and then for simultaneously rotatably moving both of said members to bring plates of one thereof into overlapped and spaced relation to stator plates.

2. The combination of claim 1 hereof in which there are means for holding one of said members yieldingly while the other thereof is being moved relative thereto.

3. The combination of claim 1 hereof in which one of said members is held yieldingly by a spring tensioning device while the other thereof is being moved relatively thereto.

4. The combination of claim 1 hereof in which the stator-rotor member is held yieldingly against movement while the rotor member is being moved relative thereto, and in which there are interengaging means between the rotor member and the stator-rotor member for communicating rotative motion from the rotor member to the stator-rotor member.

5. The combination of claim 1 hereof in which the arrangement is such that the rotor member moves through substantially one hundred and eighty degrees into intermeshing relation with the stator-rotor member and the stator-rotor member and the rotor member move as a combined unit through substantially one hundred and eighty degrees to bring plates of one of said members into intermeshing relation with plates of the stator.

6. The combination of claim 1 hereof in which the stator-rotor plates are mounted on a revoluble frame and the rotor member is mounted on a shaft on the axis of the frame, and in which the arrangement is such that the rotor must be moved substantially one hundred and eighty degrees to bring its plates fully into intermeshing relation with stator-rotor plates, and with interengaging means between said two members for communicating rotative movement from the rotor member to the stator-rotor member at the end of such substantially one-hundred-and-eighty-degree movement, and wherein the rotor and the stator-rotor members as a combined unit must be moved substantially one hundred and eighty degrees to bring plates of one of said members fully into intermeshing relation with stator plates.

7. In an electrostatic condenser of the character described, the combination of a stator, a rotor member, and a stator-rotor member, each of said members and said stator comprising a plurality of plates side by side and spaced apart, a rotatably mounted shaft on which the rotor member is mounted to turn with the shaft, the stator-rotor member being mounted on the axis of said shaft for rotative movement and for intermeshing relation with the rotor member, the stator being mounted to have intermeshing relation with one of said members, tensioning means for holding the stator-rotor member yieldingly, and means including means for rotatably moving said shaft for moving rotor plates first into intermeshing relation with stator-rotor plates and for then rotatably moving both of said members as a unit to bring plates of one thereof into intermeshed relation with stator plates.

8. In an electrostatic condenser of the character described, the combination of a stator, a rotor member and a stator-rotor member respectively mounted whereby rotor plates may be intermeshed with stator-rotor plates and the rotor and stator-rotor may be turned as a unit to overlap plates of one of said members with stator plates, hand-operable means for turning the rotor and stator-rotor members in one direction, spring means adapted to be placed under rotative tension through the unitary movement of the rotor and stator-rotor members when moved by hand in such direction, and means providing yielding resistance to the hand-operable means adapted to hold the stator-rotor in any one of its normal relative positions against the rotative action of said spring means, said resistance being such that when the hand-operable means are turned by hand in the reverse direction and said resistance is relieved thereby said spring means will move the stator-rotor member in the reverse direction.

9. In an electrostatic condenser of the character described having at least three series of plates and hand-operable means for moving one series into another series and for then moving both said series whereby plates of one of them will move into overlapped relation with plates of the third series, the combination therewith of spring means for moving one of said series out of overlapped relation when the hand-operable means are turned in the reverse direction, together with means providing a yielding resistance adapted to hold said spring-movable series in a given relative position except when said resistance is relieved by moving the hand-operable means in the reverse direction.

10. The combination of claim 9 hereof in which said three series of plates are mounted on a common axis.

11. The combination of claim 9 hereof in which one of said series is a rotor, another is a stator-rotor and the third is a stator, all mounted on a common axis.

12. The combination of claim 9 hereof in which said yielding-resistance means are adjustable to vary the resistance thereof.

13. The combination of claim 9 hereof in which one of said series is mounted in a rotatably-mounted frame and the other two series are mounted on the axis of rotation of the frame.

14. The combination of claim 9 hereof in which one of said series is a rotor and there is a shaft on which said rotor is mounted to turn with the shaft, another of said series being a stator-rotor mounted in a frame, said frame being mounted to turn on the axis of said shaft, the third series being a stator also mounted on the axis of said shaft.

GEORGE W. HAYDEN.